US011476998B2

(12) United States Patent
Gutman et al.

(10) Patent No.: US 11,476,998 B2
(45) Date of Patent: Oct. 18, 2022

(54) LOSSLESS COMPRESSION OF CHANNEL STATE FEEDBACK

(71) Applicant: QUALCOMM Incorporated, San Diego, CA (US)

(72) Inventors: Igor Gutman, Ramat Gan (IL); Shay Landis, Hod Hasharon (IL); Gideon Shlomo Kutz, Ramat Hasharon (IL); Ran Berliner, Kfar-Aviv (IL); Alexandros Manolakos, San Diego, CA (US); Ariel Yaakov Sagi, Haifa (IL); Guy Wolf, Rosh Haayin (IL); Sharon Levy, Binyamina (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/937,833

(22) Filed: Jul. 24, 2020

(65) Prior Publication Data
US 2021/0050981 A1 Feb. 18, 2021

(30) Foreign Application Priority Data
Aug. 14, 2019 (GR) .............................. 20190100358

(51) Int. Cl.
*H04L 5/00* (2006.01)
*H04L 1/00* (2006.01)
*H04W 28/06* (2009.01)

(52) U.S. Cl.
CPC .......... *H04L 5/0057* (2013.01); *H04L 1/0003* (2013.01); *H04L 1/0026* (2013.01);
(Continued)

(58) Field of Classification Search
CPC ... H04L 5/0057; H04L 1/0003; H04L 1/0026; H04L 5/005; H04L 5/0094; H04L 1/0007;
(Continued)

(56) References Cited

U.S. PATENT DOCUMENTS

| | | | | |
|---|---|---|---|---|
| 8,437,705 B2* | 5/2013 | Khoshnevis | .......... | H04L 1/0026 455/69 |
| 2008/0207135 A1* | 8/2008 | Varadarajan | .......... | H04L 1/0029 455/69 |

(Continued)

OTHER PUBLICATIONS

International Search Report and Written Opinion—PCT/US2020/043759—ISA/EPO—dated Oct. 14, 2020.
(Continued)

*Primary Examiner* — Ian N Moore
*Assistant Examiner* — Latresa A McCallum
(74) *Attorney, Agent, or Firm* — Yanling Yang

(57) ABSTRACT

Methods, systems, and devices for wireless communication are described. Generally, the described techniques provide for efficiently reporting channel state feedback for a set of subbands. As an example, a user equipment (UE) may receive a set of reference signals on the set of subbands and determine a respective channel quality indicator (CQI) index for each of the set of subbands based on the reference signals. The UE may then transmit indications of CQI indices for different subbands of the set using variable length indications, such as indications that include different numbers of bits. Since, in some examples, a small length or number of bits may be allocated for reporting CQI indices with a high probability of being reported, overhead in a wireless communications system may be reduced.

27 Claims, 16 Drawing Sheets

(52) U.S. Cl.
CPC ............ *H04L 5/005* (2013.01); *H04L 5/0094* (2013.01); *H04W 28/06* (2013.01)

(58) Field of Classification Search
CPC ..... H04L 47/365; H04L 1/0014; H04L 69/04; H04L 69/32; H04W 28/06; H04W 4/18; H03M 7/30
See application file for complete search history.

(56) References Cited

U.S. PATENT DOCUMENTS

| | | | |
|---|---|---|---|
| 2009/0109909 A1* | 4/2009 | Onggosanusi | H04B 7/0617 370/329 |
| 2009/0116570 A1* | 5/2009 | Bala | H04L 1/0029 375/260 |
| 2009/0154588 A1 | 6/2009 | Chen et al. | |
| 2010/0015923 A1* | 1/2010 | Golitschek | H04W 24/10 455/67.7 |

OTHER PUBLICATIONS

Texas Instruments, "All Sub-band Differential CQI Feedback for E-UTRA," 3GPP TSG RAN WG1# 51, R1-074694, 3rd Generation Partnership Project (3GPP), Mobile Competence Centre 650; Route Des Lucioles; F-06921 Sophia-Antipolis Cedex; France, vol. RAN WG1, No. Korea; Oct. 30, 2007, Oct. 30, 2007 (Oct. 30, 2007), XP050108169, [retrieved on Oct. 30, 2007], Section 2.

* cited by examiner

| Subband Differential CQI Value | Offset Level |
|---|---|
| 0 | 0 |
| 1 | 1 |
| 2 | ≥ 2 |
| 3 | ≤ -1 |

| SB Index | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| CQI | 11 | 8 | 9 | 13 | 11 | 9 | 9 | 11 | 12 | 9 | 9 | 11 | 12 | 10 | 9 | 10 |
| Offset from WB | 1 | -2 | -1 | 3 | 1 | -1 | -2 | 1 | 2 | -1 | -2 | 1 | 3 | 0 | -3 | 0 |
| Reported Offset from WB | 1 | -1 | -1 | 2 | 1 | -1 | -1 | 1 | 2 | -1 | -1 | 1 | 2 | 0 | -1 | 0 |

300

| Value | Assumed Probability % | Huffman Encoding |
|---|---|---|
| 0 | 90 | 1 |
| 1 | 4 | 011 |
| -1 | 4 | 00 |
| 2 | 1 | 0100 |
| -2 | 1 | 0101 |

| Value | Assumed Probability % | Huffman Encoding |
|---|---|---|
| 0 | 50 | 1 |
| 1 | 20 | 011 |
| -1 | 20 | 00 |
| 2 | 4 | 01011 |
| -2 | 4 | 0100 |
| 3 and above | 1 | 010101 |
| -3 and below | 1 | 010100 |

| Value | Assumed Probability % | Huffman Encoding |
|---|---|---|
| 0 | 30 | 10 |
| 1 | 20 | 01 |
| -1 | 20 | 00 |
| 2 | 10 | 1111 |
| -2 | 10 | 110 |
| 3 and above | 5 | 11101 |
| -3 and below | 5 | 11100 |

| Value | Encoding |
|---|---|
| 0 | 00 |
| 1 | 01 |
| -1 and below | 10 |
| 2 and above | 11 |

LOSSLESS COMPRESSION OF CHANNEL STATE FEEDBACK

CROSS REFERENCE

The present Application for Patent claims the benefit of Greek Provisional Patent Application No. 20190100358 by GUTMAN et al., entitled "LOSSLESS COMPRESSION OF CHANNEL STATE FEEDBACK," filed Aug. 14, 2019, which is assigned to the assignee hereof and expressly incorporated by reference herein.

BACKGROUND

The following relates generally to wireless communications and more specifically to lossless compression of channel state feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may be configured to report channel state feedback to a base station to allow the base station to efficiently schedule and configure communications with the UE. As an example, a UE may transmit an indication of a channel quality indicator (CQI) index to a base station for the base station to use to determine a modulation and coding scheme (MCS) for communications with the UE, which may in some cases be referred to as a CQI for brevity. If the UE supports communications with the base station on multiple subbands, the UE may transmit a CQI for each of the multiple subbands (e.g., for closed-loop multiple-input multiple-output (MIMO) communications).

SUMMARY

The described techniques relate to improved methods, systems, devices, and apparatuses that support lossless compression of channel state feedback. Generally, the described techniques provide for efficiently reporting channel state feedback for a set of subbands. As an example, a user equipment (UE) may receive a set of reference signals on a set of subbands and may determine a respective channel quality indicator (CQI) index for each subband of the set of subbands based on the reference signals. The UE may then transmit an indication of a first CQI index for a first subband using a first number of bits and transmit an indication of a second CQI index for a second subband using a second number of bits that is different than the first number of bits. Because the UE may use different numbers of bits to indicate different CQI indices, and a small number of bits may be allocated for reporting CQI indices with a high probability of being reported, overhead in a wireless communications system may be reduced.

A method for wireless communication at a UE is described. The method may include receiving a set of reference signals on a set of subbands, determining, based on the set of reference signals, a respective CQI index for each of the set of subbands, transmitting, to a base station, an indication of a first CQI index for a first subband of the set, where the indication of the first CQI index includes a first number of bits, and transmitting, to the base station, an indication of a second CQI index for a second subband of the set, where the indication of the second CQI index includes a second number of bits that is different than the first number of bits.

An apparatus for wireless communication at a UE is described. The apparatus may include a processor, memory in electronic communication with the processor, and instructions stored in the memory. The instructions may be executable by the processor to cause the apparatus to receive a set of reference signals on a set of subbands, determine, based on the set of reference signals, a respective CQI index for each of the set of subbands, transmit, to a base station, an indication of a first CQI index for a first subband of the set, where the indication of the first CQI index includes a first number of bits, and transmit, to the base station, an indication of a second CQI index for a second subband of the set, where the indication of the second CQI index includes a second number of bits that is different than the first number of bits.

Another apparatus for wireless communication at a UE is described. The apparatus may include means for receiving a set of reference signals on a set of subbands, means for determining, based on the set of reference signals, a respective CQI index for each of the set of subbands, means for transmitting, to a base station, an indication of a first CQI index for a first subband of the set, where the indication of the first CQI index includes a first number of bits, and means for transmitting, to the base station, an indication of a second CQI index for a second subband of the set, where the indication of the second CQI index includes a second number of bits that is different than the first number of bits.

A non-transitory computer-readable medium storing code for wireless communication at a UE is described. The code may include instructions executable by a processor to receive a set of reference signals on a set of subbands, determine, based on the set of reference signals, a respective CQI index for each of the set of subbands, transmit, to a base station, an indication of a first CQI index for a first subband of the set, where the indication of the first channel CQI includes a first number of bits, and transmit, to the base station, an indication of a second CQI index for a second subband of the set, where the indication of the second CQI index includes a second number of bits that is different than the first number of bits.

Some examples of the method, apparatuses, and non-transitory computer-readable medium described herein may further include operations, features, means, or instructions for transmitting, to the base station, an indication of a baseline CQI index, where the indication of the first CQI index indicates a first offset between the baseline CQI index and the first CQI index, and the indication of the second CQI index indicates a second offset between the baseline CQI index and the second CQI index. In some examples of the method, apparatuses, and non-transitory computer-readable medium described herein, the baseline CQI index may be a third CQI index for a third subband of the set.

Some examples of the method, apparatuses, and non-transitory computer-readable medium described herein may further include operations, features, means, or instructions for transmitting, to the base station, an indication of an encoding scheme used to encode the indication of the first CQI index and the indication of the second CQI index, where the encoding scheme may be one of a set of encoding schemes supported by the UE for encoding indications of CQI indices. Some examples of the method, apparatuses, and non-transitory computer-readable medium described herein may further include operations, features, means, or instructions for identifying a frequency correlation for the set of subbands, and selecting the encoding scheme from the set of encoding schemes based on the frequency correlation for the set of subbands.

In some examples of the method, apparatuses, and non-transitory computer-readable medium described herein, the encoding scheme is a first encoding scheme of the set. Some examples of the method, apparatuses, and non-transitory computer-readable medium described herein may further include operations, features, means, or instructions for determining a first message length for transmitting indications of CQI indices for the set of subbands using the first encoding scheme, determining a second message length for transmitting indications of the CQI indices for the set of subbands using a second encoding scheme of the set, and determining that the first message length may be less than the second message length, where selecting the first encoding scheme may be based on the first message length being less than the second message length. In some examples of the method, apparatuses, and non-transitory computer-readable medium described herein, the second message length may be fixed, and the first message length may be based on the frequency correlation for the set of subbands. In some examples of the method, apparatuses, and non-transitory computer-readable medium described herein, the encoding scheme may be based on Huffman coding.

In some examples of the method, apparatuses, and non-transitory computer-readable medium described herein, transmitting the indication of the first CQI index and the indication of the second CQI index may be in accordance with a first schedule, and transmitting the indication of the encoding scheme may be in accordance with a second schedule that may be less frequent than the first schedule. Some examples of the method, apparatuses, and non-transitory computer-readable medium described herein may further include operations, features, means, or instructions for determining that a number of the set of subbands may be above a threshold, where transmitting the indication of the first CQI index and the indication of the second CQI index using different numbers of bits may be based on the number of the set of subbands being above the threshold.

A method for wireless communication at a base station is described. The method may include transmitting, to a UE, a set of reference signals on a set of subbands, receiving, from the UE, an indication of a first CQI index for a first subband of the set, where the indication of the first CQI index includes a first number of bits, and receiving, from the UE, an indication of a second CQI index for a second subband of the set, where the indication of the second CQI index includes a second number of bits that is different than the first number of bits.

An apparatus for wireless communication at a base station is described. The apparatus may include a processor, memory in electronic communication with the processor, and instructions stored in the memory. The instructions may be executable by the processor to cause the apparatus to transmit, to a UE, a set of reference signals on a set of subbands, receive, from the UE, an indication of a first CQI index for a first subband of the set, where the indication of the first CQI index includes a first number of bits, and receive, from the UE, an indication of a second CQI index for a second subband of the set, where the indication of the second CQI index includes a second number of bits that is different than the first number of bits.

Another apparatus for wireless communication at a base station is described. The apparatus may include means for transmitting, to a UE, a set of reference signals on a set of subbands, means for receiving, from the UE, an indication of a first CQI index for a first subband of the set, where the indication of the first CQI index includes a first number of bits, and means for receiving, from the UE, an indication of a second CQI index for a second subband of the set, where the indication of the second CQI index includes a second number of bits that is different than the first number of bits.

A non-transitory computer-readable medium storing code for wireless communication at a base station is described. The code may include instructions executable by a processor to transmit, to a UE, a set of reference signals on a set of subbands, receive, from the UE, an indication of a first CQI index for a first subband of the set, where the indication of the first CQI index includes a first number of bits, and receive, from the UE, an indication of a second CQI index for a second subband of the set, where the indication of the second CQI index includes a second number of bits that is different than the first number of bits.

Some examples of the method, apparatuses, and non-transitory computer-readable medium described herein may further include operations, features, means, or instructions for receiving, from the UE, an indication of a baseline CQI index, where the indication of the first CQI index indicates a first offset between the baseline CQI index and the first CQI index, and the indication of the second CQI index indicates a second offset between the baseline CQI index and the second CQI index. In some examples of the method, apparatuses, and non-transitory computer-readable medium described herein, the baseline CQI index may be a third CQI index for a third subband of the set.

Some examples of the method, apparatuses, and non-transitory computer-readable medium described herein may further include operations, features, means, or instructions for determining a modulation and coding scheme to use for a downlink transmission on the first subband based on the indication of the first CQI index or for a downlink transmission on the second subband based on the indication of the second CQI index, and transmitting the downlink transmission on the first subband or the second subband using the determined modulation and coding scheme.

Some examples of the method, apparatuses, and non-transitory computer-readable medium described herein may further include operations, features, means, or instructions for receiving, from the UE, an indication of an encoding scheme for the indication of the first CQI index and the indication of the second CQI index, selecting a decoding scheme based on the indication of the encoding scheme, where the decoding scheme may be one of a set of decoding schemes supported by the base station for decoding indications of channel quality indices, and decoding, based on the decoding scheme, the indication of the first CQI index and the indication of the second CQI index to obtain the first CQI index and the second CQI index.

In some examples of the method, apparatuses, and non-transitory computer-readable medium described herein, the decoding scheme may be a first decoding scheme of the set and assigns different numbers of bits to indications of different CQI indices, and a second decoding scheme of the set assigns a fixed number of bits to all indications of CQI indices. In some examples of the method, apparatuses, and non-transitory computer-readable medium described herein, the decoding scheme may be based on Huffman coding.

In some examples of the method, apparatuses, and non-transitory computer-readable medium described herein, receiving the indication of the first CQI index and the indication of the second CQI index may be in accordance with a first schedule, and receiving the indication of the encoding scheme may be in accordance with a second schedule that may be less frequent than the first schedule. Some examples of the method, apparatuses, and non-transitory computer-readable medium described herein may further include operations, features, means, or instructions for determining that a number of the set of subbands may be above a threshold, where receiving the indication of the first CQI index and the indication of the second CQI index using different numbers of bits may be based on the number of the set of subbands being above the threshold.

DETAILED DESCRIPTION

In some wireless communications systems, a user equipment (UE) may perform channel measurements based on reference signals received from a base station, and the UE may transmit channel state feedback to the base station including the results of the channel measurements. Using the channel state feedback, the base station may be able to efficiently schedule and configure communications with the UE (e.g., uplink or downlink communications). Examples of channel state feedback include channel state indicators (CQIs), rank indicators (RIs), and precoding matrix indicators (PMIs).

In some cases, a UE may be scheduled to report a CQI index for each of a number of subbands. In such cases, as the number of subbands for which CQI indices are to be reported increases, so too may the overhead of channel state feedback. In some cases, to reduce associated overhead and because the length of uplink control messages may be limited, CQI reporting may be quantized. For instance, rather than indicating a CQI index for each subband explicitly, a UE may be configured to report the CQI index for each subband as an offset of a baseline CQI index. If, however, the number of offset levels configured to be indicated is too low, and the CQI indices vary significantly across a set of subbands, the UE may not be able to accurately indicate a CQI index using the limited offset levels. As a result, a base station may use inaccurate CQI indices to configure communications with the UE (e.g., to select a modulation and coding scheme (MCS) for the UE), resulting in reduced throughput.

As described herein, a UE may support efficient techniques for reporting CQI indices for a set of subbands. As an example, the UE may use different numbers of bits to indicate different CQI indices, and a small number of bits may be allocated for reporting CQI indices with a high probability of being reported. This and other aspects of the techniques described herein may reduce overhead in a wireless communications system for reporting CQI indices, may support the use of additional offset levels (and thus more accurate reporting, more accurate MCS assignments, and increased throughput), among other benefits that may be appreciated by one of ordinary skill in the art. For example, because the indication of a CQI index may be an offset of a CQI index indicated for a previous subband, and there may be at least some frequency correlation across subbands, UE 115-a may be able to more accurately indicate the CQI index for a particular subband.

Aspects of the disclosure introduced above are described below in the context of a wireless communications system. Examples of processes and signaling exchanges that support lossless compression of channel state feedback are then described. Aspects of the disclosure are further illustrated by and described with reference to apparatus diagrams, system diagrams, and flowcharts that relate to lossless compression of channel state feedback.

Figure 1:
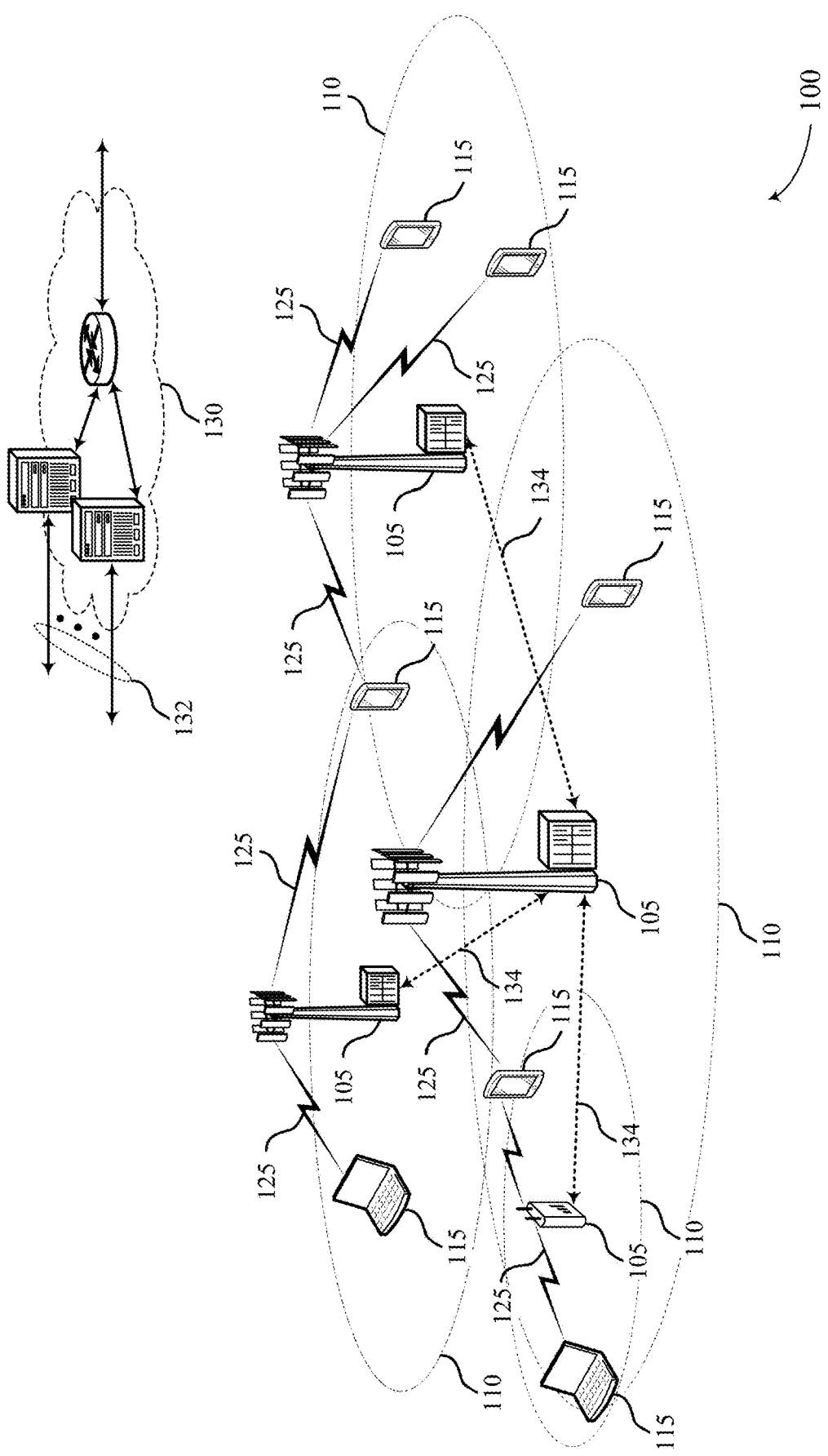
FIG. 1 illustrates an example of a wireless communications system that supports lossless compression of channel state feedback in accordance with aspects of the present disclosure.

FIG. 1 illustrates an example of a wireless communications system 100 that supports lossless compression of channel state feedback in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., on a physical uplink control channel (PUCCH) or a physical uplink shared channel (PUSCH)), or downlink transmissions from a base station 105 to a UE 115 (e.g., on a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multi-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Wireless communications system 100 may support techniques for reporting and using channel state feedback to configure and schedule communications between base stations 105 and UEs 115. A UE 115 may perform channel measurements based on reference signals received from a base station 105, and the UE 115 may transmit channel state feedback to the base station 105 including the results of the channel measurements. For instance, the UE 115 may transmit an indication of a CQI index for each of a number of subbands used to communicate with the base station 105. Using the channel state feedback, the base station may be able to efficiently schedule and configure communications with the UE (e.g., uplink or downlink communications).

In some cases, a UE 115 may be configured to report a CQI index for each subband of a set of subbands (e.g., for closed-loop MIMO in NR systems). In such cases, if the number of subbands for which a CQI index is to be reported is large, there may be a risk that the overhead of channel state feedback becomes high. To limit overhead, the length of uplink control messages may be limited, and CQI index reporting may be quantized (e.g., since the lack of quantization may result in a significant increase in uplink feedback). For instance, rather than indicating a CQI index for each subband explicitly, a UE 115 may be configured to report the CQI index for each subband as an offset of a baseline CQI index.

Figure 2:
FIG. 2 illustrates an example of a table showing the mapping of subband differential channel quality indicator (CQI) values to different offset levels.

FIG. 2 illustrates an example of a table 200 showing an example mapping of subband differential CQI values to different offset values. As illustrated in FIG. 2, to reduce overhead, the number of offset levels configured to be indicated may be low (e.g., four offset levels). In such examples, if the CQI indices for a set of subbands varies significantly, the UE may not be able to accurately indicate a CQI index using the limited offset levels. Thus, in typical allocation, where the CQI may be varying significantly, there may be total degradation in throughput (e.g., 10%-30% throughput loss) if the MCS allocation (e.g., link adaptation) is based on the reported CQI.

Figure 3:
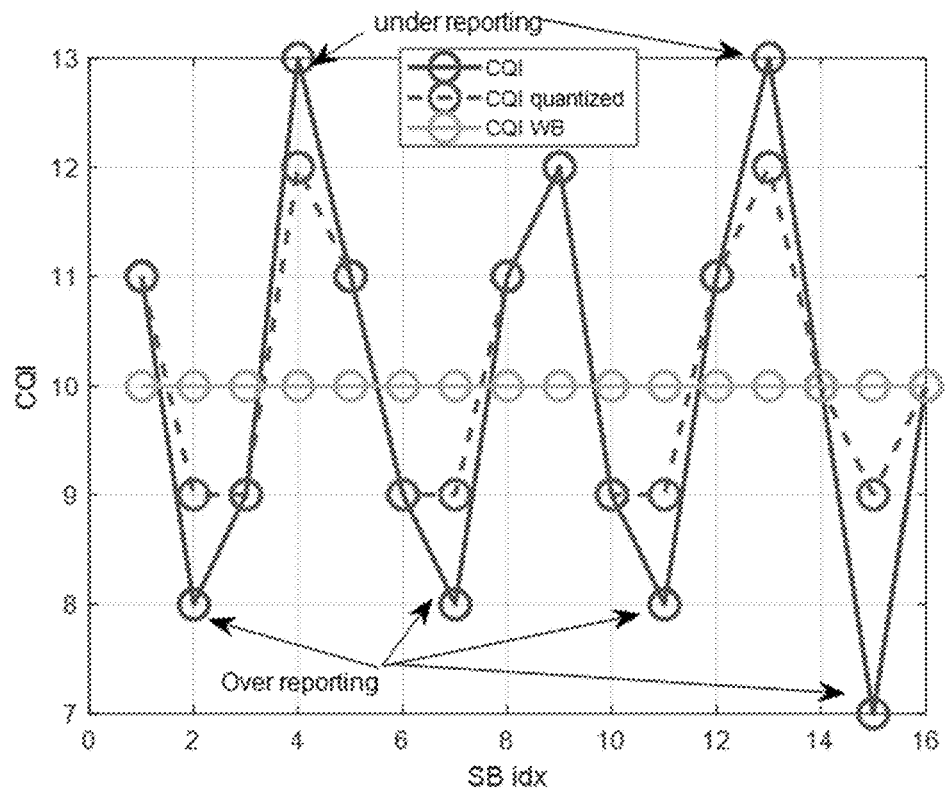
FIG. 3 illustrates an example of the possible impact of inaccurate indications of CQI indices for a set of subbands due to a limited set of reportable CQI indices (e.g., offsets).

FIG. 3 illustrates an example 300 of the possible impact of inaccurate indications of CQI indices for a set of subbands due to a limited set of reportable CQI indices (e.g., offsets). In the example of FIG. 3, a UE 115 may not be able to indicate an accurate CQI index for subbands 2, 4, 7, 11, 13, and 15 since the UE 115 may not support the explicit indication of CQI indices greater than two and less than negative one. In particular, for subbands 2, 7, 11, and 15, the UE 115 may indicate a higher CQI index than the actual CQI index (e.g., over-reporting), and, for subbands 4 and 13, the UE 115 may indicate a lower CQI index than the actual CQI index (e.g., under-reporting). In the case that the UE 115 reports a higher CQI index than the actual CQI index identified (e.g., over-reporting), a base station 105 may use the CQI index to identify a MCS higher than an appropriate MCS for a downlink transmission, and the UE 115 may not be able to decode the downlink transmission (e.g., since the actual channel conditions may be worse than indicated). That is, over-reporting may result in full throughput loss. Alternatively, in the case that the UE 115 reports a lower CQI index than the actual CQI index identified (e.g., under-reporting), a base station 105 may use the CQI index to identify an MCS lower than a supported MCS for a downlink transmission, and throughput may be restricted (e.g., since the actual channel conditions may allow for a higher MCS). That is, under-reporting may result in non-optimal throughput.

Wireless communications system 100 may support efficient techniques for CQI reporting for a set of subbands. The techniques described herein for reducing the overhead for CQI reporting while supporting accurate CQI reporting may be beneficial, including when the number of the set of subbands is large. In particular, the overhead compression gains may be of increased benefit as the number of subbands increases. As such, the techniques described herein for CQI reporting may in some cases be applied when the number of subbands is greater than a threshold (e.g., more than X subbands). That is, because overhead is generally higher with type two feedback, or higher rank feedback, the techniques described below may in some case be selectively utilized when the rank is higher than a threshold on the number of subbands (e.g., where the rank may correspond to whether type two feedback is used).

Figure 4:
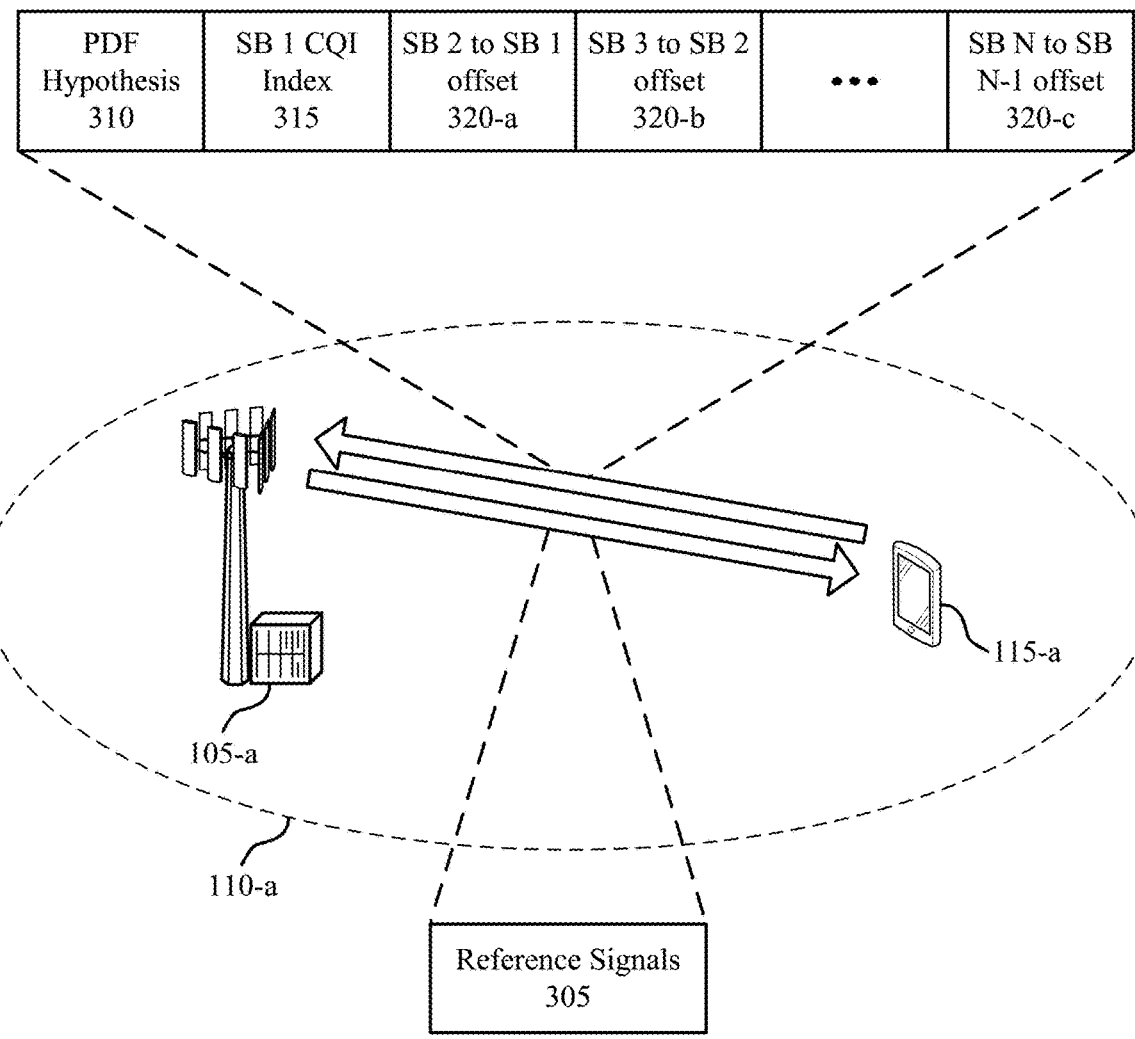
FIG. 4 illustrates an example of a wireless communications system that supports lossless compression of channel state feedback in accordance with aspects of the present disclosure.

FIG. 4 illustrates an example of a wireless communications system 400 that supports lossless compression of channel state feedback in accordance with aspects of the present disclosure. Wireless communications system 400 includes base station 105-a, which may be an example of a base station 105 described with reference to FIGS. 1-3. Wireless communications system 400 also includes UE 115-a, which may be an example of a UE 115 described with reference to FIGS. 1-3. Wireless communications system 400 may implement aspects of wireless communications system 100. For example, wireless communications system 400 may support efficient techniques for CQI reporting for a set of subbands.

In the example of FIG. 4, base station 105-a may transmit, and UE 115-a may receive, a set of reference signals 305 on a set of subbands, and UE 115-a may determine a respective CQI index for each of the set of subbands based on the reference signals 305. UE 115-a may then transmit an indication of a first CQI index for a first subband using a first number of bits and transmit an indication of a second CQI index for a second subband using a second number of bits that is different than the first number of bits. The indication of the first CQI index and the indication of the second CQI index may be indications of offsets from a CQI index indicated for a previous subband. Because UE 115-a may use different numbers of bits to indicate different CQI indices, and a small number of bits may be allocated for reporting CQI indices with a high probability of being reported, overhead in a wireless communications system may be reduced. Further, because the indication of a CQI index may be an offset of a CQI index indicated for a previous subband, and there may be at least some frequency correlation across subbands, UE 115-a may be able to accurately indicate the CQI index for a particular subband.

In the example described above, the bits used to indicate the CQI indices for different subbands may be determined based on an encoding scheme, and the encoding scheme may be selected based on the frequency correlation between a set of subbands for which CQI indices are being reported. As such, UE 115-a may transmit an indication of the encoding scheme 310 (or probability density function PDF hypothesis 310), such that base station 105-a may be able to correctly interpret the indications from UE 115-a. UE 115-a may transmit an explicit indication of a baseline CQI index 315 for subband 1, and UE 115-a may transmit indications of CQI indices 320 for subsequent subbands as offsets of the CQI index of a previous subband. For instance, UE 115-a may transmit the indication of the CQI index 320-a for subband 2 as an offset of the CQI index for subband 1, UE 115-a may transmit the indication of the CQI index 320-b for subband 3 as an offset of the CQI index for subband 2, and UE 115-a may transmit the indication of the CQI index 320-c for subband N as an offset of the CQI index for subband N−1 (or transmit the indication of the CQI index 320-c for subband N−1 as an offset of the CQI index for subband N, and so on). Base station 105-a may then decode the indications based on the encoding scheme 310. In particular, base station 105-a may select a decoding scheme based on the encoding scheme 310, and base station 105-a may decode the indications of CQI indices received from UE 115-a based on the decoding scheme the CQI indices.

As mentioned above, even in severe channel conditions with a long delay spread, there may still be some frequency correlation between subbands, and the UE 115-a may be able to accurately signal the CQI index for a subband as an offset or delta of the CQI index of a previous subband (e.g., a previous subband that is adjacent to the subband in a subband order). That is, instead of reporting the CQI explicitly, or a quantized version of the CQI, UE 115-a may report the CQI offsets or deltas between the adjacent subbands. In some cases, because the distribution of the offsets or deltas may be non-uniform, and an entropy coding (e.g., Huffman coding) or other lossless compression coding may be used to generate the encoding schemes used to indicate the CQI index offsets. In the example of FIG. 4, the selected encoding scheme 310 may be signaled to base station 105-a. In this example, to prevent excessive overhead, the indication of the selected encoding scheme 310 may be signaled less frequently than CQI reports (e.g., with a lower periodicity or according to a schedule having a lower periodicity). In other examples, however, the encoding scheme may be preconfigured and may be identified at UE 115-a and at base station 105-a.

Figure 5:
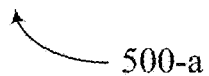
FIG. 5 illustrates examples of encoding schemes used to report CQI indices in accordance with aspects of the present disclosure.
Figure 5:
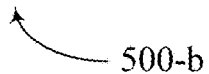
Figure 5:
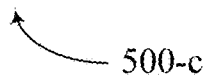

FIG. 5 illustrates examples of encoding schemes 500 used to report CQI indices in accordance with aspects of the present disclosure. The encoding schemes may be predefined (e.g., a predefined set of PDFs) in a protocol and may be selected by UE 115-a (e.g., with limited additional complexity at the UE) and indicated to base station 105-a (e.g., without additional complexity at the base station) as described with reference to FIG. 4. That is, in order to achieve the entropy, it may be appropriate for UE 115-a and base station 105-a to identify the PDF of the deltas, which may previously be unknown.

In a first example 500-a, UE 115-a may determine that there is a high correlation between subbands for which the UE 115-a is to report channel state feedback. Thus, UE 115-a may select the encoding scheme illustrated in the first example 500-a for encoding CQI indices to be reported based on determining that there is a high correlation between subbands. The selected encoding scheme may correspond to a set of assumed probabilities that track the determined degree (e.g., high degree) of correlation. The first example 500-a may assume or otherwise correspond to a 90% chance that the CQI index for one subband is the same as the CQI index for a previous, adjacent subband, a 4% chance that the CQI index for one subband is one more than the CQI index for a previous, adjacent subband, a 4% chance that the CQI index for one subband is one less than the CQI index for a previous, adjacent subband, a 1% chance that the CQI index for one subband is two more than the CQI index for a previous, adjacent subband, and a 1% chance that the CQI index for one subband is two less than the CQI index for a previous, adjacent subband. That is, UE 115-a may use '1' to indicate an offset of zero, '011' to indicate an offset of one, '00' to indicate an offset of negative one, '0100' to indicate an offset of two, and '0101' to indicate an offset of negative two. It is to be understood that other specific probability assumptions (e.g., PDFs) may be used for an encoding scheme associated with high correlation or any other level of correlation.

In a second example 500-b, UE 115-a may determine that there is medium correlation between subbands for which the UE 115-a is to report channel state feedback. Thus, UE 115-a may select the encoding scheme illustrated in the second example 500-b for encoding CQI indices to be reported based on determining that there is a medium correlation between subbands. The second example 500-b may assume a 50% chance that the CQI index for one subband is the same as the CQI index for a previous, adjacent subband, a 20% chance that the CQI index for one subband is one more than the CQI index for a previous, adjacent subband, a 20% chance that the CQI index for one subband is one less than the CQI index for a previous, adjacent subband, a 4% chance that the CQI index for one subband is two more than the CQI index for a previous, adjacent subband, a 4% chance that the CQI index for one subband is two less than the CQI index for a previous, adjacent subband, a 1% chance that the CQI index for one subband is three more than the CQI index for a previous, adjacent subband or more than three above, and a 1% chance that the CQI index for one subband is three less than the CQI index for a previous, adjacent subband or less than three below. That is, UE 115-a may use '1' to indicate an offset of zero, '011' to indicate an offset of one, '00' to indicate an offset of negative one, '01011' to indicate an offset of two, '0100' to indicate an offset of negative two, '010101' to indicate an offset of three and above, and '010100' to indicate an offset of negative three and below.

In a third example 500-c, UE 115-a may determine that there is low correlation between subbands for which the UE 115-a is to report channel state feedback. Thus, UE 115-a may select the encoding scheme illustrated in the third example 500-c for encoding CQI indices to be reported based on determining that there is low correlation between subbands. The third example 500-c may assume a 30% chance that the CQI index for one subband is the same as the CQI index for a previous, adjacent subband, a 20% chance that the CQI index for one subband is one more than the CQI index for a previous, adjacent subband, a 20% chance that the CQI index for one subband is one less than the CQI index for a previous, adjacent subband, a 10% chance that the CQI index for one subband is two more than the CQI index for a previous, adjacent subband, a 10% chance that the CQI index for one subband is two less than the CQI index for a previous, adjacent subband, a 5% chance that the CQI index for one subband is three more than the CQI index for a previous, adjacent subband or more than three above, and a 5% chance that the CQI index for one subband is three less than the CQI index for a previous, adjacent subband or less than three below. That is, UE 115-a may use '10' to indicate an offset of zero, '01' to indicate an offset of one, '00' to indicate an offset of negative one, '1111' to indicate an offset of two, '110' to indicate an offset of negative two, '11101' to indicate an offset of three and above, and '111000 to indicate an offset of negative three and below.

In each of the examples described above, because a lower number of bits may be used to indicate the CQI index offsets with the higher probabilities of being reported, the overhead associated with CQI reporting may be low. For instance, the overhead associated with CQI reporting when there is high correlation between subbands may be 1.08 bits, the overhead associated with CQI reporting when there is medium correlation between subbands may be 1.48 bits, and the overhead associated with CQI reporting when there is low correlation between subbands may be 2.2 bits. UE 115-a may select an encoding scheme of the configured encoding schemes (e.g., the three encoding schemes described with reference to FIG. 5) based on determining which of the encoding schemes most accurately represents the frequency correlation between identified CQI indices (e.g., which probabilities for reporting CQI indices are closest to the actual CQI probabilities determined based on the correlation between CQI indices). In some cases, offsets greater than three or less than negative three may not be practical, and indication of such offsets may or may not be supported.

In the above examples, UE 115-a may select an encoding scheme for reporting CQI for a set of subbands based on a frequency correlation between the set of subbands. UE 115-a may then report different CQI indices using different numbers of bits, where the indication of the CQI index for one subband is an offset of the CQI index indicated for a previous, adjacent subband. In other examples, however, it may be appropriate for the UE 115-a to report different CQI indices using a same number of bits, where the indication of the CQI index for one subband is an offset of the CQI index indicated for a wideband. In such examples, the UE 115-a may select an encoding scheme for CQI reporting different from the encoding schemes described with reference to FIG. 5.

Figure 6:
FIG. 6 illustrates an example of an encoding scheme for CQI reporting in accordance with aspects of the present disclosure.

FIG. 6 illustrates an example of an encoding scheme 600 for CQI reporting, where a same number of bits is used to indicate different CQI index offsets from a baseline, wideband CQI index. In the example of FIG. 6, UE 115-a may use '00' to indicate an offset of zero, '01' to indicate an offset of one, '10' to indicate an offset of negative one and below, and '11' to indicate an offset of two and above.

As discussed with reference to FIG. 2, however, the encoding scheme described with reference to FIG. 6 may result in inaccurate CQI reporting if the CQIs across different subbands vary significantly. In some cases, however, it may be appropriate to use the encoding scheme described with reference to FIG. 6 (e.g., if the overhead for CQI reporting using another encoding scheme is too high). Thus, as described herein, UE 115-a may support techniques for selecting whether to indicate a CQI index for a subband as an offset of the CQI index for a previous subband according to an encoding scheme described with reference to FIG. 5 (e.g., relying on the frequency correlation between subbands to limit overhead) or to indicate a CQI index for a subband as an offset of the CQI index for a wideband according to the encoding scheme described with reference to FIG. 6.

In one example, if the maximum uplink message length for reporting a CQI index for each of a set of subbands based on the CQI index for a wideband (e.g., msgLengthDefault) is less than the maximum uplink message length for reporting a CQI index for each of a set of subbands based on the CQI index for a previous, adjacent subband (e.g., msgLengthLow), UE 115-a may report the CQI index for each of the set of subbands based on the CQI index for a wideband. That is, UE 115-a may use the encoding scheme described with reference to FIG. 6 to indicate CQI indices. Otherwise, UE 115-a may report the CQI index for each of the set of subbands based on the CQI index for a previous, adjacent subband. That is, UE 115-a may use any of the encoding schemes described with reference to FIG. 5. In this case, UE 115-a may select which of the encoding schemes (e.g., Huffman encoding schemes) to use to report CQI indices based on the level of correlation between subbands (e.g., high, medium, or low correlation). Since the high, medium, and low correlation encoding schemes may be used to indicate a same or larger range of CQI indices than the encoding scheme described with reference to FIG. 6, UE 115-a may select in real time the hypothesis that has an optimal message length subject to performance. That is, the decision of whether to use the encoding schemes described with reference to FIG. 5 or the encoding scheme described with reference to FIG. 6 may depend on overhead and performance (e.g., which encoding scheme would support accurate CQI reporting).

Figure 7:
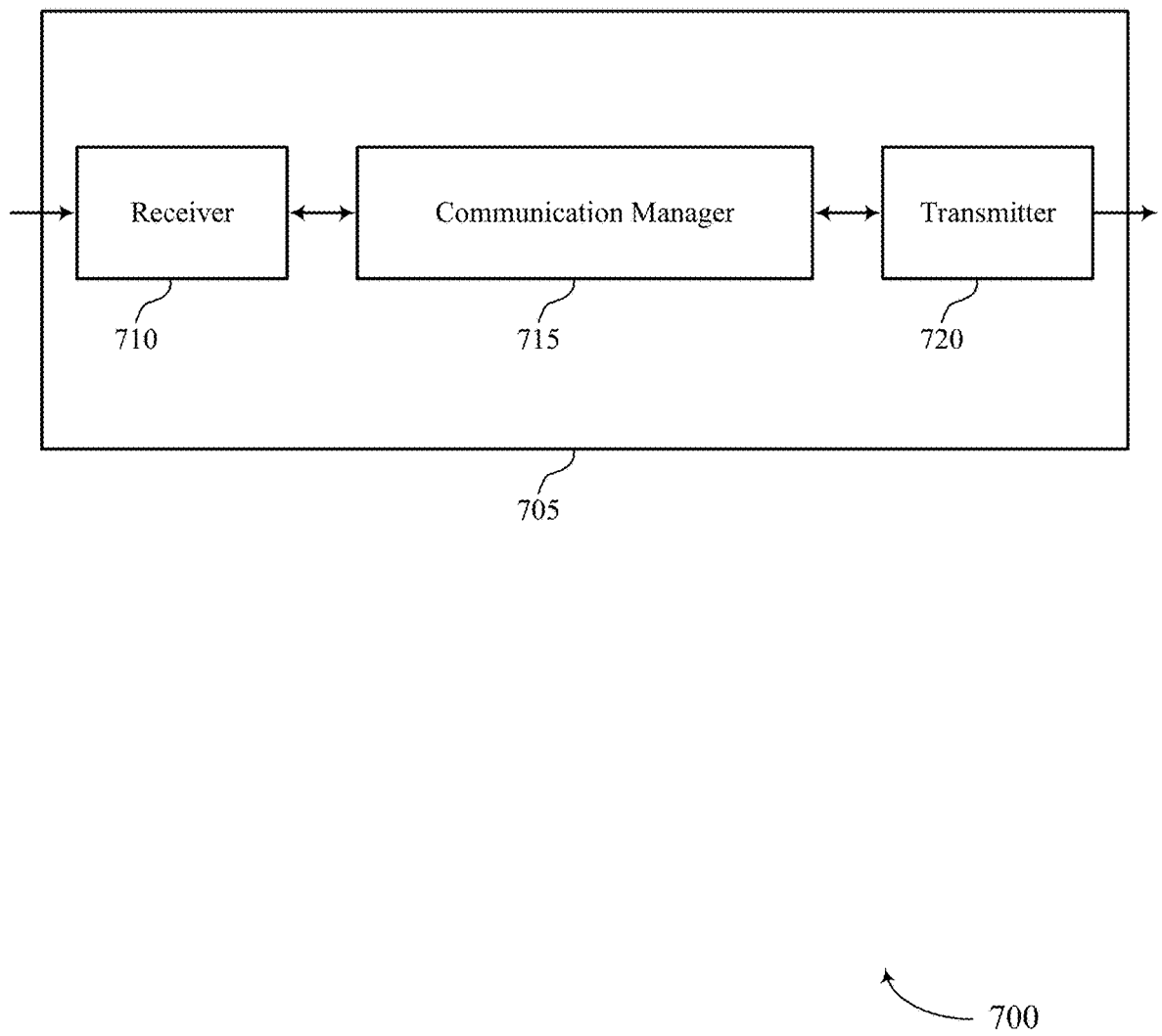
FIGS. 7 and 8 show block diagrams of devices that support lossless compression of channel state feedback in accordance with aspects of the present disclosure.

FIG. 7 shows a block diagram 700 of a device 705 that supports lossless compression of channel state feedback in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to lossless compression of channel state feedback, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may receive a set of reference signals on a set of subbands, determine, based on the set of reference signals, a respective CQI index for each of the set of subbands, transmit, to a base station, an indication of a first CQI index for a first subband of the set, where the indication of the first CQI index includes a first number of bits, and transmit, to the base station, an indication of a second CQI index for a second subband of the set, where the indication of the second CQI index includes a second number of bits that is different than the first number of bits. The communication manager 715 may be an example of aspects of the communication manager 1010 described herein.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages. One implementation may allow a UE to accurately report CQI feedback. Accordingly, a base station may be able to identify appropriate configurations for communications with the UE (e.g., an appropriate MCS). The base station may also be able to appropriately schedule communications with the UE (e.g., based on channel conditions). Further, in some cases, a processor at the UE may avoid attempting to process and decode downlink transmissions from a base station transmitted with an MCS that is too high (e.g., since the UE may accurately report CQI feedback).

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

Figure 8:
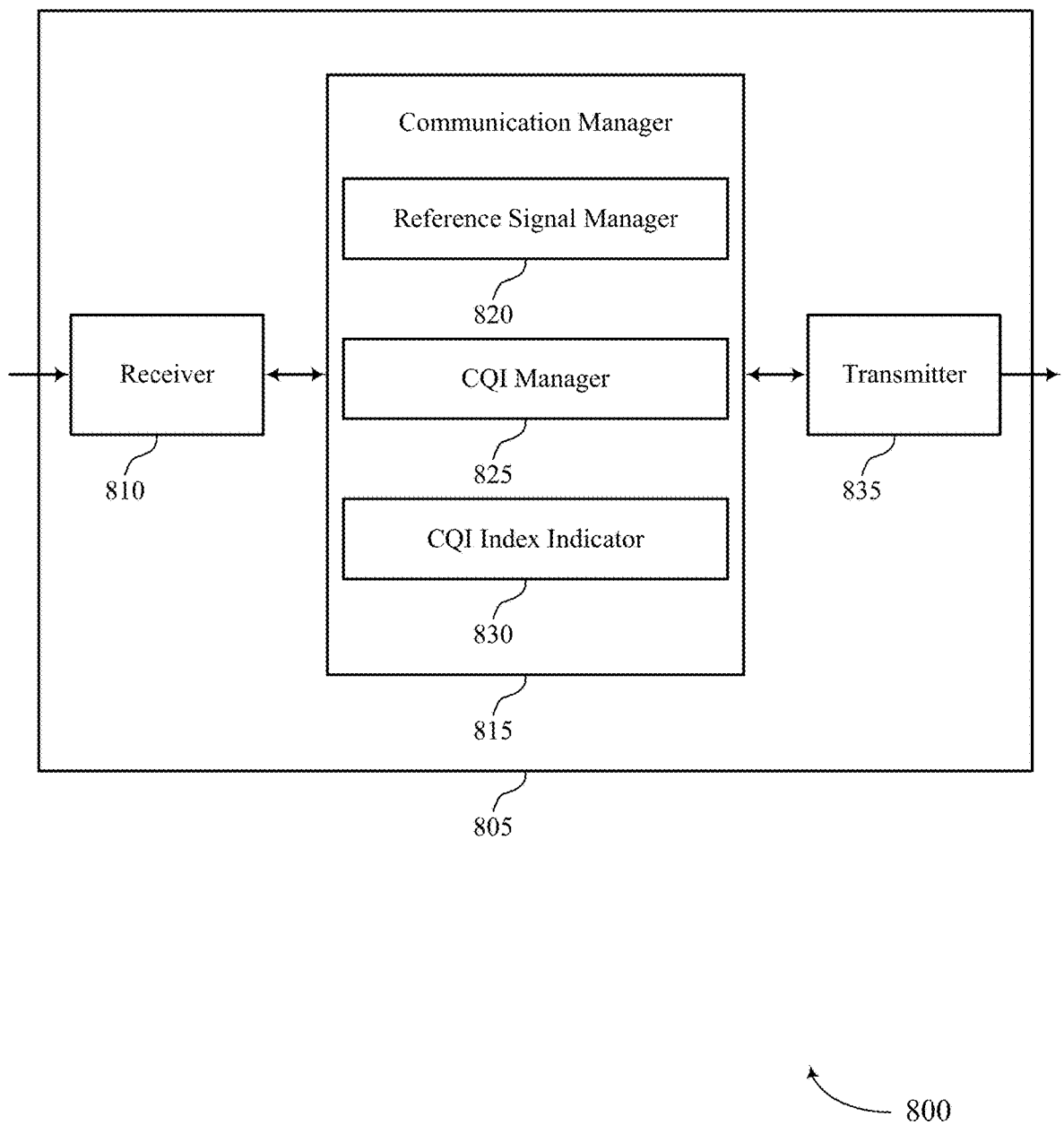

FIG. 8 shows a block diagram 800 of a device 805 that supports lossless compression of channel state feedback in accordance with aspects of the present disclosure. The device 805 may be an example of aspects of a device 705, or a UE 115 as described herein. The device 805 may include a receiver 810, a communication manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to lossless compression of channel state feedback, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a reference signal manager 820, a CQI manager 825, and a CQI index indicator 830. The communication manager 815 may be an example of aspects of the communication manager 1010 described herein.

The reference signal manager 820 may receive a set of reference signals on a set of subbands. The CQI manager 825 may determine, based on the set of reference signals, a respective CQI index for each of the set of subbands. The CQI index indicator 830 may transmit, to a base station, an indication of a first CQI index for a first subband of the set, where the indication of the first CQI index includes a first number of bits and transmit, to the base station, an indication of a second CQI index for a second subband of the set, where the indication of the second CQI index includes a second number of bits that is different than the first number of bits.

The transmitter 835 may transmit signals generated by other components of the device 805. In some examples, the transmitter 835 may be collocated with a receiver 810 in a transceiver module. For example, the transmitter 835 may be an example of aspects of the transceiver 1015 described with reference to FIG. 10. The transmitter 835 may utilize a single antenna or a set of antennas.

Figure 9:
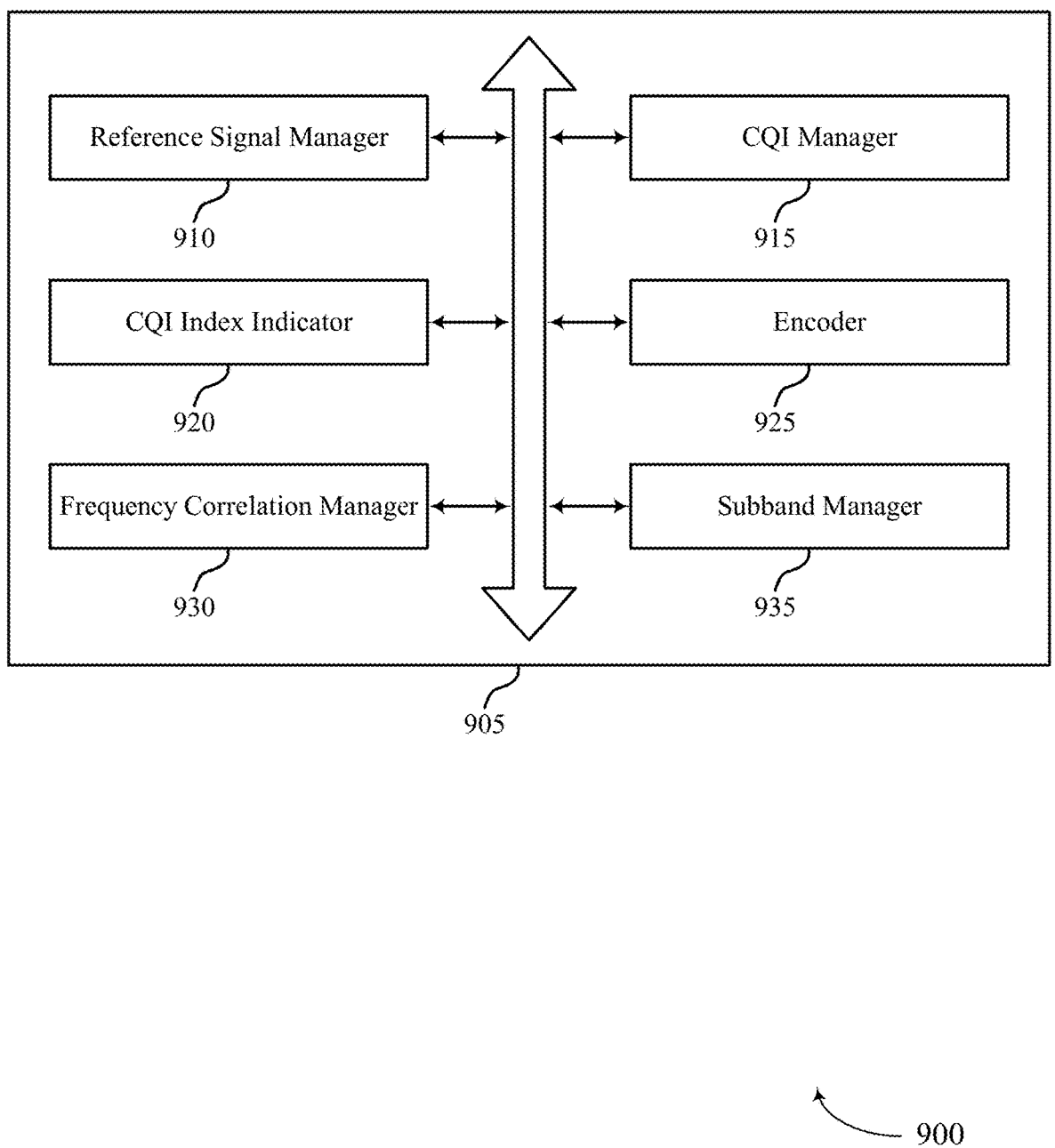
FIG. 9 shows a block diagram of a communication manager that supports lossless compression of channel state feedback in accordance with aspects of the present disclosure.

FIG. 9 shows a block diagram 900 of a communication manager 905 that supports lossless compression of channel state feedback in accordance with aspects of the present disclosure. The communication manager 905 may be an example of aspects of a communication manager 715, a communication manager 815, or a communication manager 1010 described herein. The communication manager 905 may include a reference signal manager 910, a CQI manager 915, a CQI index indicator 920, an encoder 925, a frequency correlation manager 930, and a subband manager 935. Each of these modules may communicate, directly or indirectly, with one another (e.g., via one or more buses).

The reference signal manager 910 may receive a set of reference signals on a set of subbands. The CQI manager 915 may determine, based on the set of reference signals, a respective CQI index for each of the set of subbands. The CQI index indicator 920 may transmit, to a base station, an indication of a first CQI index for a first subband of the set, where the indication of the first CQI index includes a first number of bits. The CQI index indicator 920 may also transmit, to the base station, an indication of a second CQI index for a second subband of the set, where the indication of the second CQI index includes a second number of bits that is different than the first number of bits.

In some examples, the CQI index indicator 920 may transmit, to the base station, an indication of a baseline CQI index, where the indication of the first CQI index indicates a first offset between the baseline CQI index and the first CQI index, and the indication of the second CQI index indicates a second offset between the baseline CQI index and the second CQI index. In some examples, the baseline CQI index is a third CQI index for a third subband of the set.

The encoder 925 may transmit, to the base station, an indication of an encoding scheme used to encode the indication of the first CQI index and the indication of the second CQI index, where the encoding scheme is one of a set of encoding schemes supported by the UE for encoding indications of CQI indices. The frequency correlation manager 930 may identify a frequency correlation for the set of subbands. In some examples, the encoder 925 may select the encoding scheme from the set of encoding schemes based on the frequency correlation for the set of subbands.

In some examples, the CQI index indicator 920 may determine a first message length for transmitting indications of CQI indices for the set of subbands using the first encoding scheme. In some examples, the CQI index indicator 920 may determine a second message length for transmitting indications of the CQI indices for the plurality of subbands using a second encoding scheme of the set. In some examples, the encoder 925 may determine that the first message length is less than the second message length, where selecting the first encoding scheme is based on the first message length being less than the second message length. In some cases, the second message length is fixed. In some cases, the first message length is based on the frequency correlation for the set of subbands. In some cases, the encoding scheme is based on Huffman coding.

In some examples, transmitting the indication of the first CQI index and the indication of the second CQI index is in accordance with a first schedule, and transmitting the indication of the encoding scheme is in accordance with a second schedule that is less frequent than the first schedule. The subband manager 935 may determine that a number of the set of subbands is above a threshold, where transmitting the indication of the first CQI index and the indication of the second CQI index using different numbers of bits is based on the number of the set of subbands being above the threshold.

Figure 10:
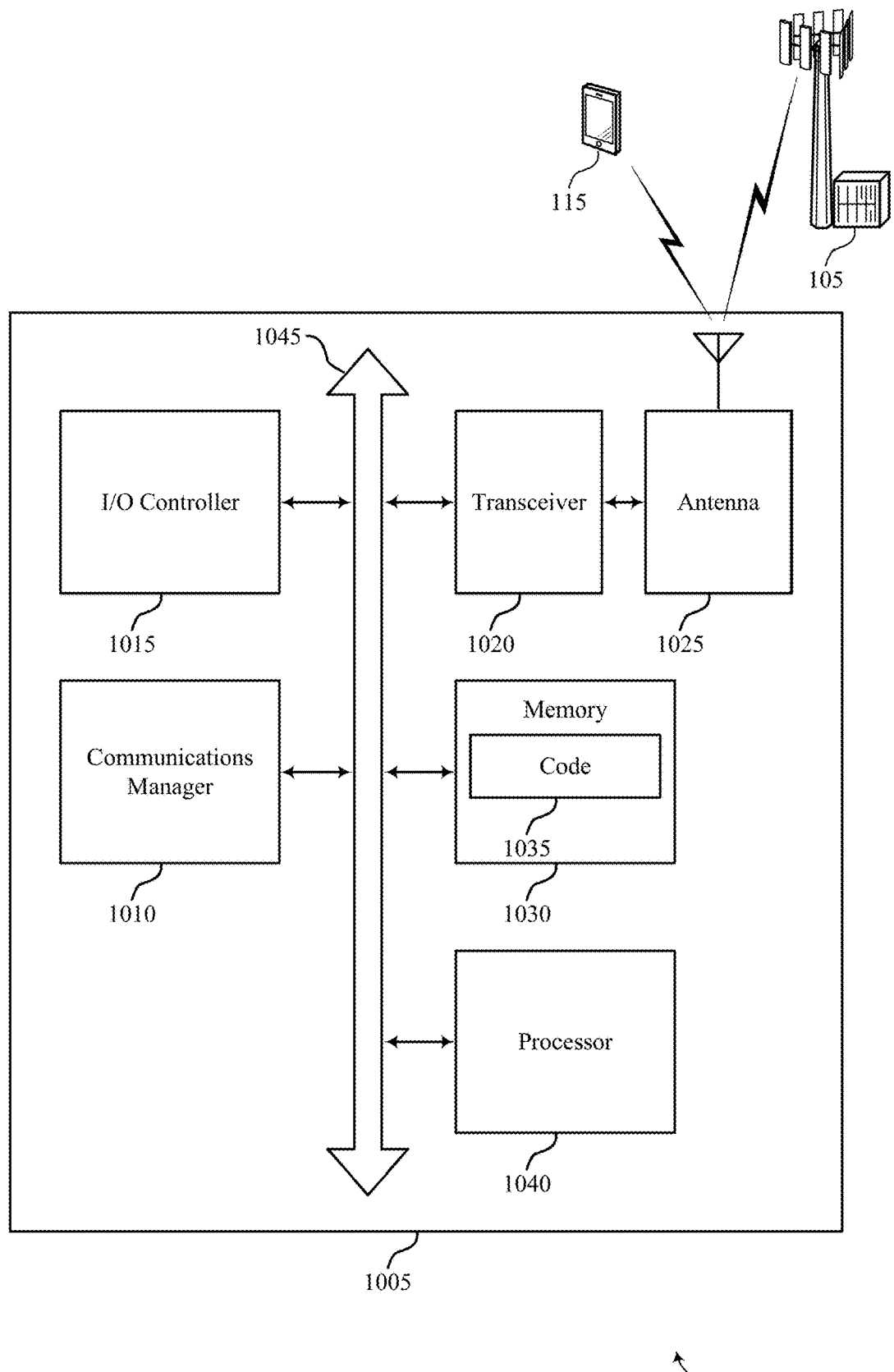
FIG. 10 shows a diagram of a system including a device that supports lossless compression of channel state feedback in accordance with aspects of the present disclosure.

FIG. 10 shows a diagram of a system 1000 including a device 1005 that supports lossless compression of channel state feedback in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, an I/O controller 1015, a transceiver 1020, an antenna 1025, memory 1030, and a processor 1040. These components may be in electronic communication via one or more buses (e.g., bus 1040).

The communication manager 1010 may receive a set of reference signals on a set of subbands, determine, based on the set of reference signals, a respective CQI index for each of the set of subbands, transmit, to a base station, an indication of a first CQI index for a first subband of the set, where the indication of the first CQI index includes a first number of bits, and transmit, to the base station, an indication of a second CQI index for a second subband of the set, where the indication of the second CQI index includes a second number of bits that is different than the first number of bits.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting lossless compression of channel state feedback).

Figure 11:
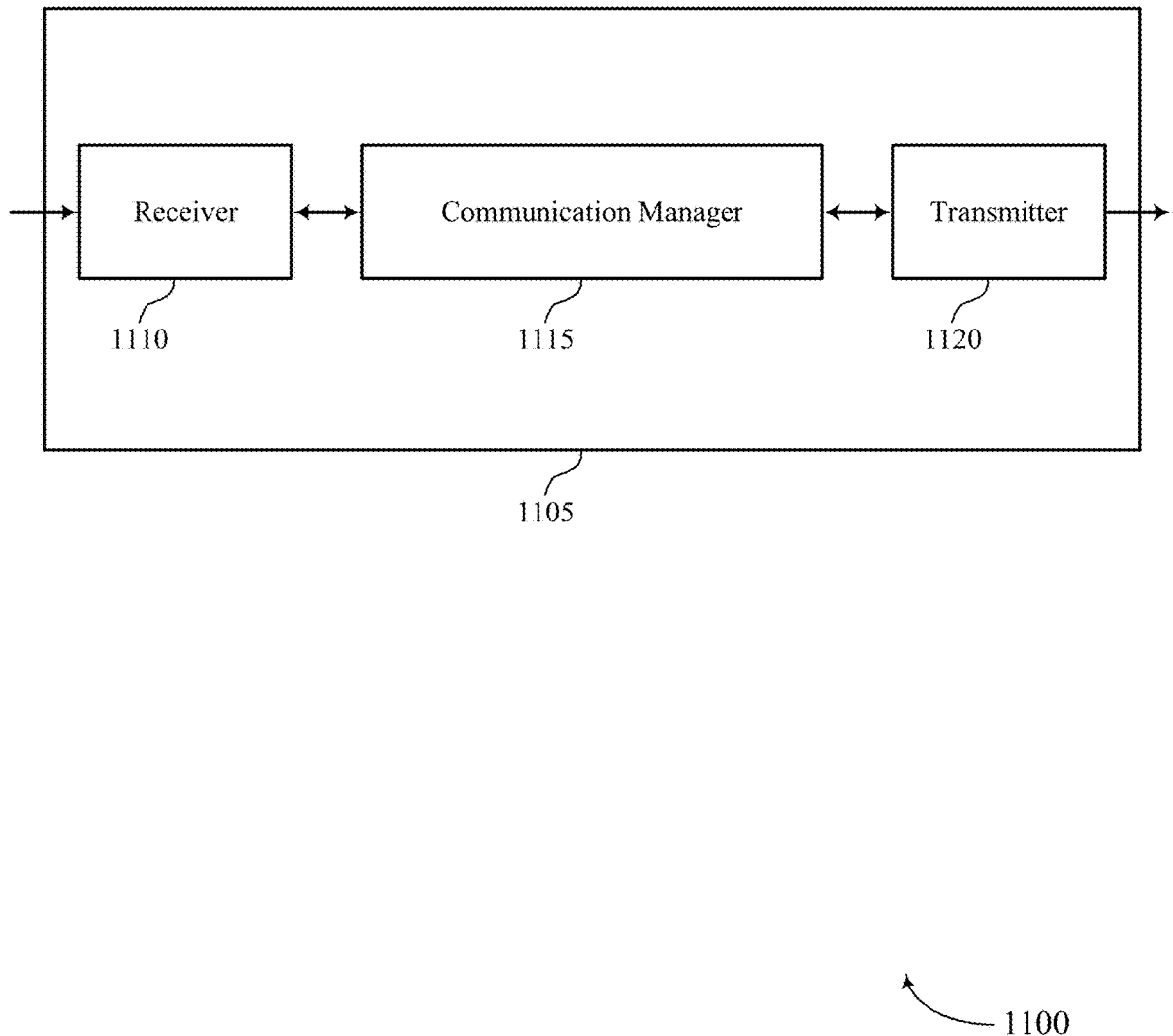
FIGS. 11 and 12 show block diagrams of devices that support lossless compression of channel state feedback in accordance with aspects of the present disclosure.

FIG. 11 shows a block diagram 1100 of a device 1105 that supports lossless compression of channel state feedback in accordance with aspects of the present disclosure. The device 1105 may be an example of aspects of abase station 105 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to lossless compression of channel state feedback, etc.). Information may be passed on to other components of the device 1105. The receiver 1110 may be an example of aspects of the transceiver 1420 described with reference to FIG. 14. The receiver 1110 may utilize a single antenna or a set of antennas.

The communication manager 1115 may transmit, to a UE, a set of reference signals on a set of subbands, receive, from the UE, an indication of a first CQI index for a first subband of the set, where the indication of the first CQI index includes a first number of bits, and receive, from the UE, an indication of a second CQI index for a second subband of the set, where the indication of the second CQI index includes a second number of bits that is different than the first number of bits. The communication manager 1115 may be an example of aspects of the communication manager 1410 described herein.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
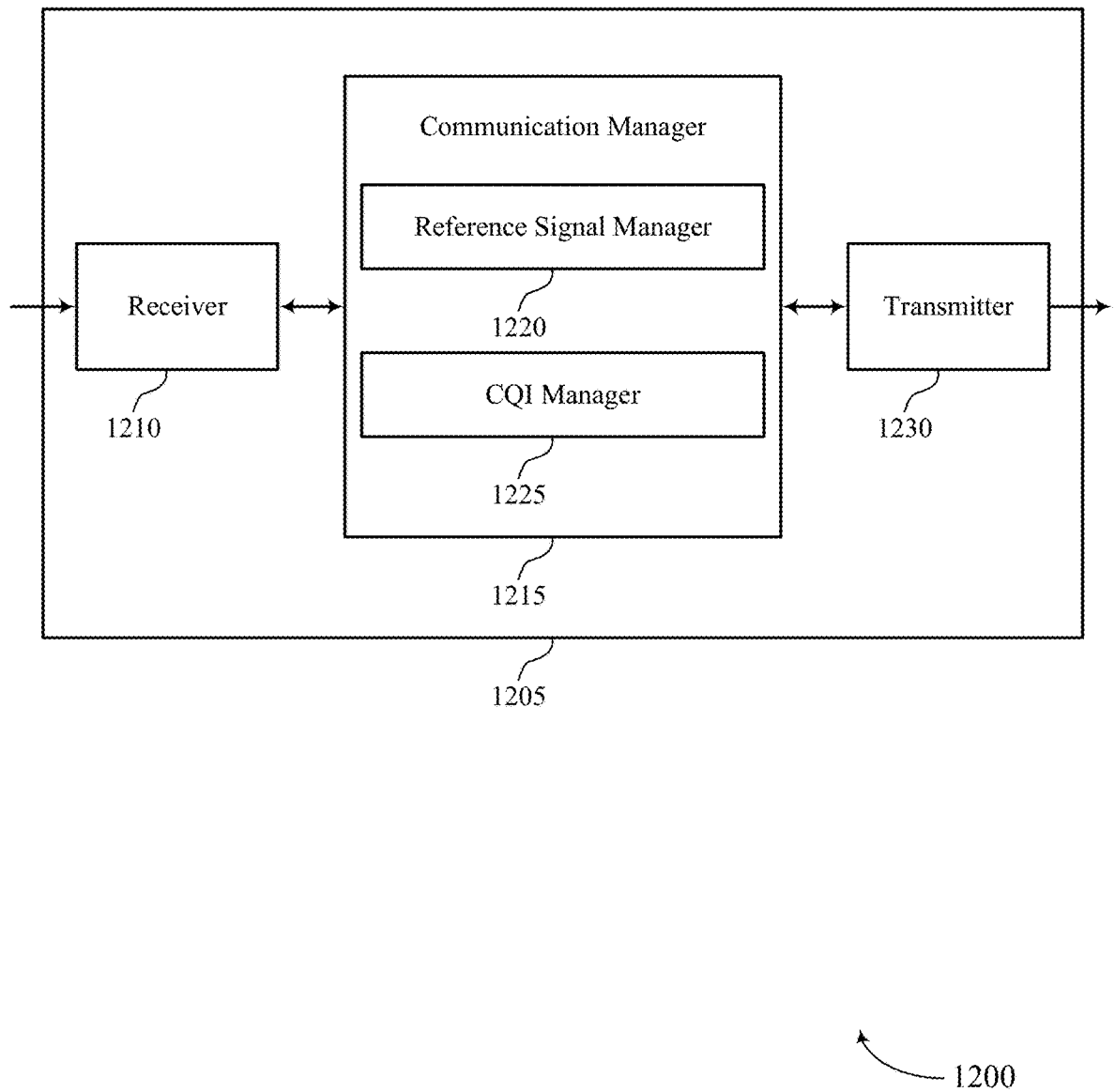

FIG. 12 shows a block diagram 1200 of a device 1205 that supports lossless compression of channel state feedback in accordance with aspects of the present disclosure. The device 1205 may be an example of aspects of a device 1105, or a base station 105 as described herein. The device 1205 may include a receiver 1210, a communication manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to lossless compression of channel state feedback, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include a reference signal manager 1220 and a CQI manager 1225. The communication manager 1215 may be an example of aspects of the communication manager 1410 described herein.

The reference signal manager 1220 may transmit, to a UE, a set of reference signals on a set of subbands. The CQI manager 1225 may receive, from the UE, an indication of a first CQI index for a first subband of the set, where the indication of the first CQI index includes a first number of bits and receive, from the UE, an indication of a second CQI index for a second subband of the set, where the indication of the second CQI index includes a second number of bits that is different than the first number of bits.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
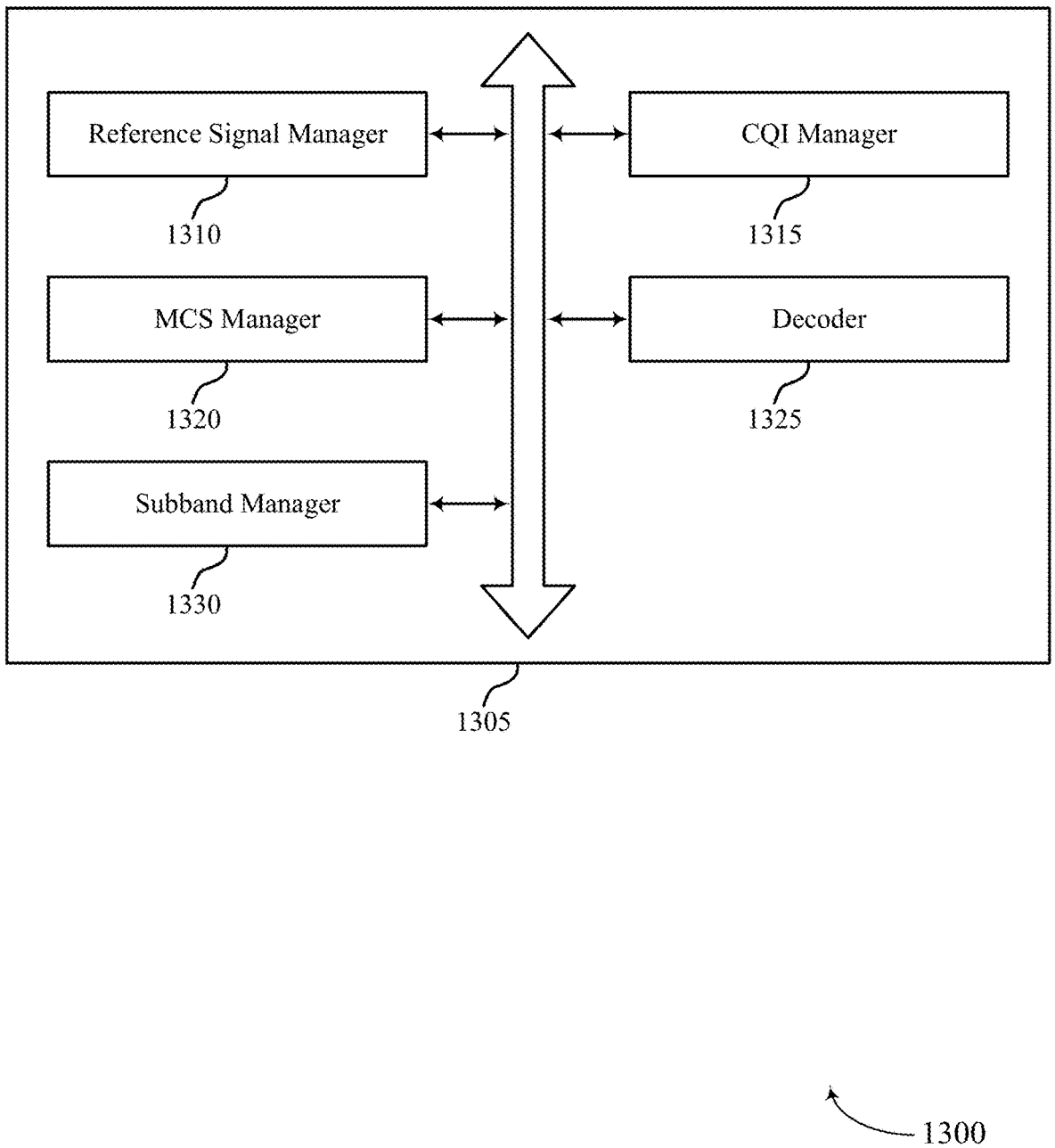
FIG. 13 shows a block diagram of a communication manager that supports lossless compression of channel state feedback in accordance with aspects of the present disclosure.

FIG. 13 shows a block diagram 1300 of a communication manager 1305 that supports lossless compression of channel state feedback in accordance with aspects of the present disclosure. The communication manager 1305 may be an example of aspects of a communication manager 1115, a communication manager 1215, or a communication manager 1410 described herein. The communication manager 1305 may include a reference signal manager 1310, a CQI manager 1315, an MCS manager 1320, a decoder 1325, and a subband manager 1330. Each of these modules may communicate, directly or indirectly, with one another (e.g., via one or more buses).

The reference signal manager 1310 may transmit, to a UE, a set of reference signals on a set of subbands. The CQI manager 1315 may receive, from the UE, an indication of a first CQI index for a first subband of the set, where the indication of the first CQI index includes a first number of bits. The CQI manager 1315 may also receive, from the UE, an indication of a second CQI index for a second subband of the set, where the indication of the second CQI index includes a second number of bits that is different than the first number of bits.

In some examples, the CQI manager 1315 may receive, from the UE, an indication of a baseline CQI index, where the indication of the first CQI index indicates a first offset between the baseline CQI index and the first CQI index; and the indication of the second CQI index indicates a second offset between the baseline CQI index and the second CQI index. In some examples, the baseline CQI index is a third CQI index for a third subband of the set.

The MCS manager 1320 may determine a modulation and coding scheme to use for a downlink transmission on the first subband based on the indication of the first CQI index or for a downlink transmission on the second subband based on the indication of the second CQI index. In some examples, the MCS manager 1320 may transmit the downlink transmission on the first subband or the second subband using the determined modulation and coding scheme.

The decoder 1325 may receive, from the UE, an indication of an encoding scheme for the indication of the first CQI index and the indication of the second CQI index. In some examples, the decoder 1325 may select a decoding scheme based on the indication of the encoding scheme, where the decoding scheme is one of a set of decoding schemes supported by the base station for decoding indications of channel quality indices. In some examples, the decoder 1325 may decode, based on the decoding scheme, the indication of the first CQI index and the indication of the second CQI index to obtain the first CQI index and the second CQI index. In some cases, the decoding scheme is a first decoding scheme of the set and assigns different numbers of bits to indications of different CQI indices. In some cases, a second decoding scheme of the set assigns a fixed number of bits to all indications of CQI indices. In some examples, the decoding scheme is based on Huffman coding.

In some examples, receiving the indication of the first CQI index and the indication of the second CQI index is in accordance with a first schedule, and receiving the indication of the encoding scheme is in accordance with a second schedule that is less frequent than the first schedule. The subband manager 1330 may determine that a number of the set of subbands is above a threshold, where receiving the indication of the first CQI index and the indication of the second CQI index using different numbers of bits is based on the number of the set of subbands being above the threshold.

Figure 14:
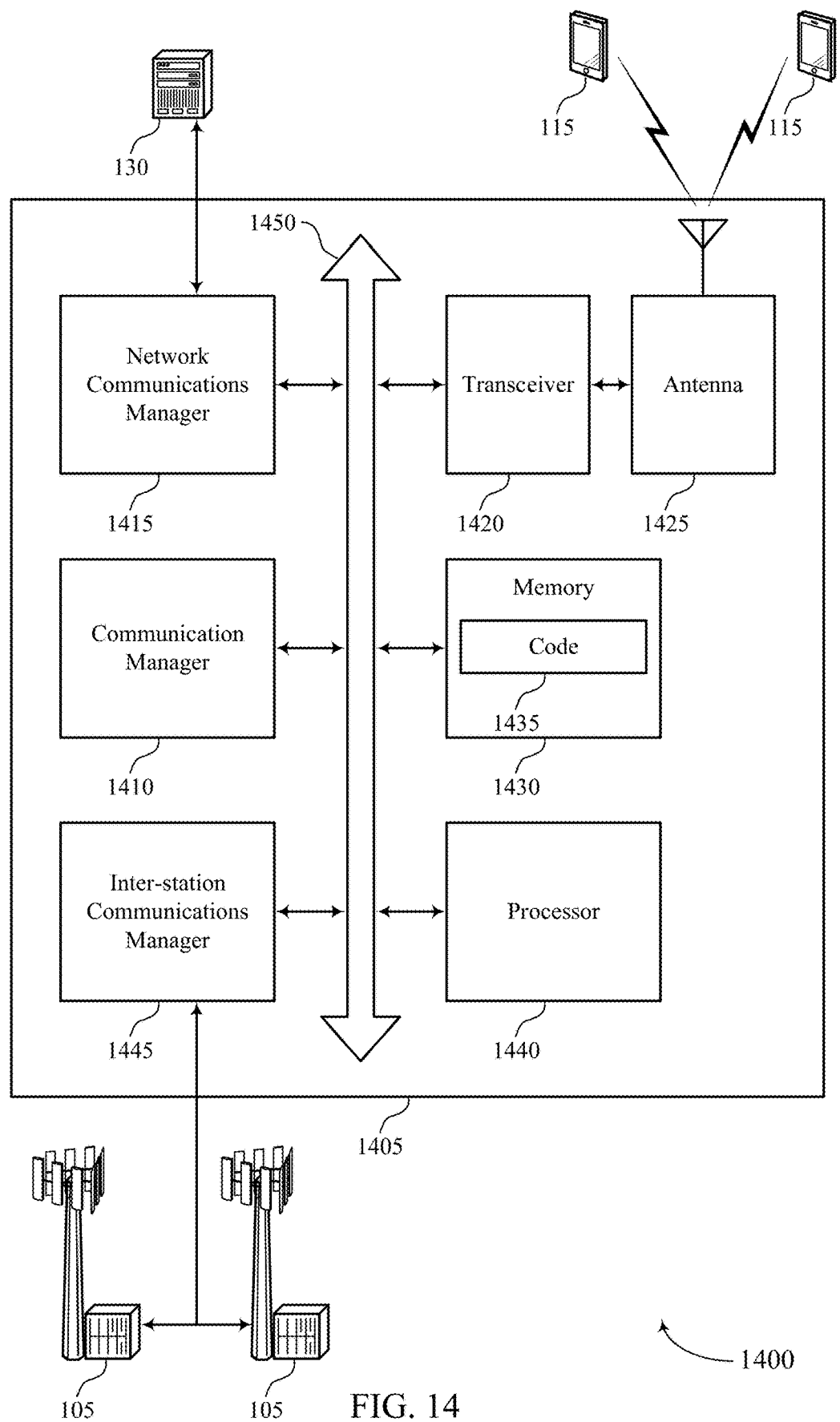
FIG. 14 shows a diagram of a system including a device that supports lossless compression of channel state feedback in accordance with aspects of the present disclosure.

FIG. 14 shows a diagram of a system 1400 including a device 1405 that supports lossless compression of channel state feedback in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communication manager 1410 may transmit, to a UE, a set of reference signals on a set of subbands, receive, from the UE, an indication of a first CQI index for a first subband of the set, where the indication of the first CQI index includes a first number of bits, and receive, from the UE, an indication of a second CQI index for a second subband of the set, where the indication of the second CQI index includes a second number of bits that is different than the first number of bits. The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting lossless compression of channel state feedback).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
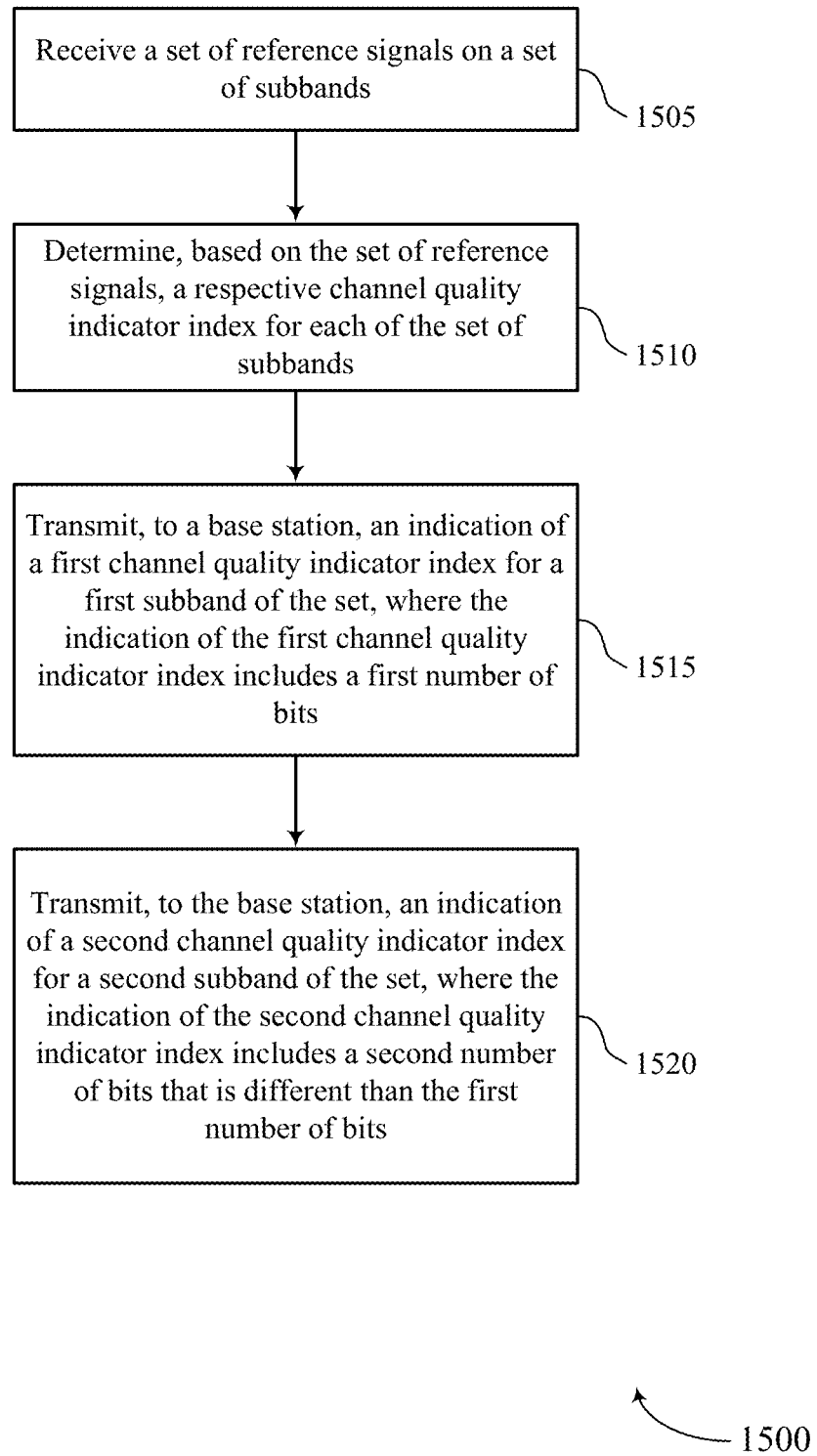
FIGS. 15 and 16 show flowcharts illustrating methods that support lossless compression of channel state feedback in accordance with aspects of the present disclosure.

FIG. 15 shows a flowchart illustrating a method 1500 that supports lossless compression of channel state feedback in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally, or alternatively, a UE may perform aspects of the described functions using special-purpose hardware.

At 1505, the UE may receive a set of reference signals on a set of subbands. The operations of 1505 may be performed according to the methods described herein. In some examples, aspects of the operations of 1505 may be performed by a reference signal manager as described with reference to FIGS. 7 through 10.

At 1510, the UE may determine, based on the set of reference signals, a respective CQI index for each of the set of subbands. The operations of 1510 may be performed according to the methods described herein. In some examples, aspects of the operations of 1510 may be performed by a CQI manager as described with reference to FIGS. 7 through 10.

At 1515, the UE may transmit, to a base station, an indication of a first CQI index for a first subband of the set, where the indication of the first CQI index includes a first number of bits. The operations of 1515 may be performed according to the methods described herein. In some examples, aspects of the operations of 1515 may be performed by a CQI index indicator as described with reference to FIGS. 7 through 10.

At 1520, the UE may transmit, to the base station, an indication of a second CQI index for a second subband of the set, where the indication of the second CQI index includes a second number of bits that is different than the first number of bits. The operations of 1520 may be performed according to the methods described herein. In some examples, aspects of the operations of 1520 may be performed by a CQI index indicator as described with reference to FIGS. 7 through 10.

Figure 16:
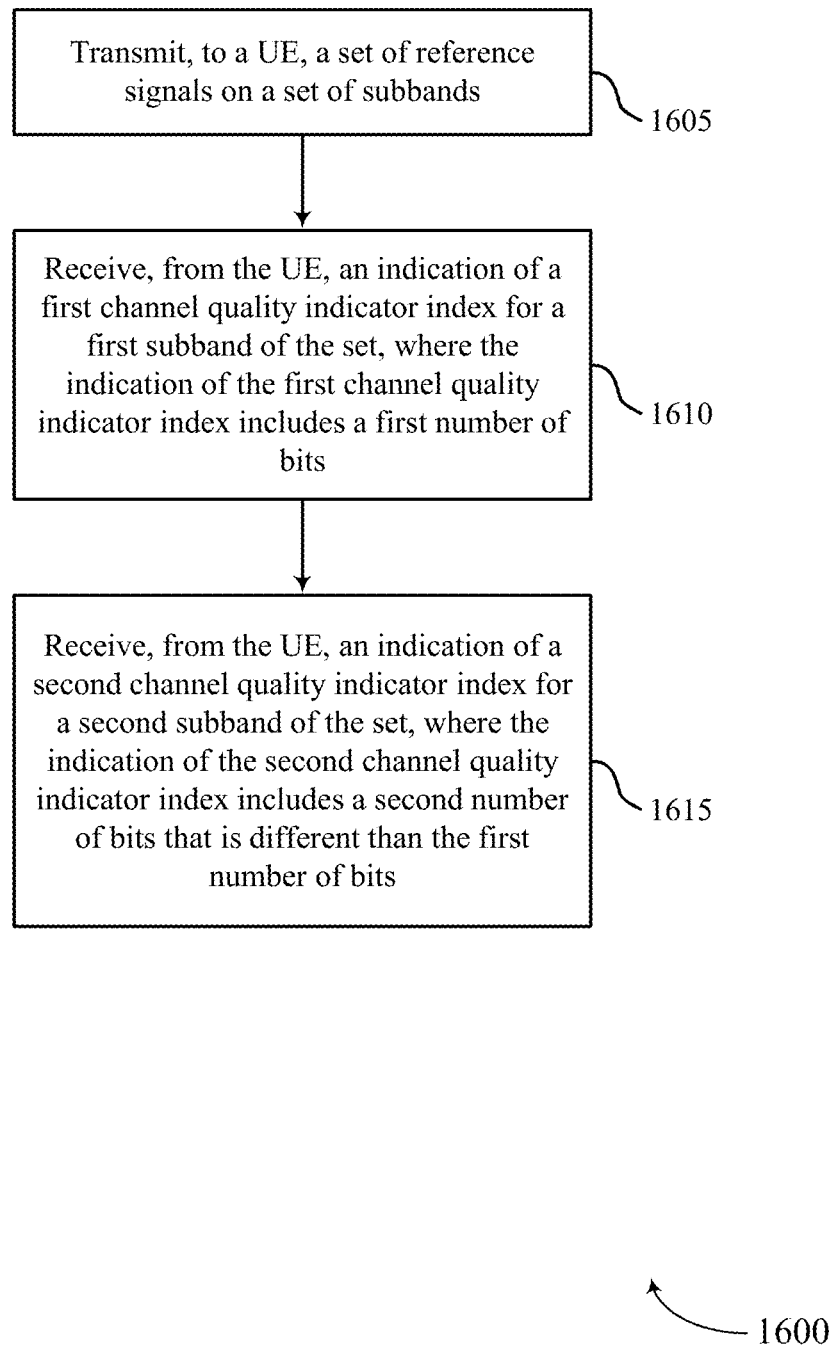

FIG. 16 shows a flowchart illustrating a method 1600 that supports lossless compression of channel state feedback in accordance with aspects of the present disclosure. The operations of method 1600 may be implemented by a base station 105 or its components as described herein. For example, the operations of method 1600 may be performed by a communication manager as described with reference to FIGS. 11 through 14. In some examples, a base station may execute a set of instructions to control the functional elements of the base station to perform the described functions. Additionally, or alternatively, a base station may perform aspects of the described functions using special-purpose hardware.

At 1605, the base station may transmit, to a UE, a set of reference signals on a set of subbands. The operations of 1605 may be performed according to the methods described herein. In some examples, aspects of the operations of 1605 may be performed by a reference signal manager as described with reference to FIGS. 11 through 14.

At 1610, the base station may receive, from the UE, an indication of a first CQI index for a first subband of the set, where the indication of the first CQI index includes a first number of bits. The operations of 1610 may be performed according to the methods described herein. In some examples, aspects of the operations of 1610 may be performed by a CQI manager as described with reference to FIGS. 11 through 14.

At 1615, the base station may receive, from the UE, an indication of a second CQI index for a second subband of the set, where the indication of the second CQI index includes a second number of bits that is different than the first number of bits. The operations of 1615 may be performed according to the methods described herein. In some examples, aspects of the operations of 1615 may be performed by a CQI manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a plurality of reference signals on a plurality of subbands;
   determining, based at least in part on the plurality of reference signals, a respective channel quality indicator index for each of the plurality of subbands;
   selecting an encoding scheme from a set of encoding schemes for encoding indications of channel quality indicator indices for subbands, wherein the selected encoding scheme is based at least in part on Huffman coding;
   transmitting, to a network device, an indication of a baseline channel quality indicator index;
   transmitting, to the network device and based at least in part on transmitting the indication of the baseline channel quality indicator index, an indication of a first channel quality indicator index for a first subband of the plurality, wherein the indication of the first channel quality indicator index comprises a first number of bits in accordance with the selected encoding scheme; and
   transmitting, to the network device and based at least in part on transmitting the indication of the baseline channel quality indicator index, an indication of a second channel quality indicator index for a second subband of the plurality, wherein the indication of the second channel quality indicator index comprises a second number of bits that is different than the first number of bits in accordance with the selected encoding scheme.

2. The method of claim 1, wherein:
   the indication of the first channel quality indicator index indicates a first offset between the baseline channel quality indicator index and the first channel quality indicator index; and
   the indication of the second channel quality indicator index indicates a second offset between the baseline channel quality indicator index and the second channel quality indicator index.

3. The method of claim 1, wherein the baseline channel quality indicator index is a third channel quality indicator index for a third subband of the plurality.

4. The method of claim 1, further comprising:
   transmitting, to the network device, an indication of the selected encoding scheme.

5. The method of claim 4, wherein:
   transmitting the indication of the first channel quality indicator index and the indication of the second channel quality indicator index is in accordance with a first schedule; and
   transmitting the indication of the selected encoding scheme is in accordance with a second schedule that is less frequent than the first schedule.

6. The method of claim 1, further comprising:
   identifying a frequency correlation for the plurality of subband, wherein selecting the encoding scheme is based at least in part on the frequency correlation for the plurality of subbands.

7. The method of claim 1, wherein the selected encoding scheme is a first encoding scheme of the set, the method further comprising:
   determining a first message length for transmitting indications of channel quality indicator indices for the plurality of subbands using the first encoding scheme;
   determining a second message length for transmitting indications of the channel quality indicator indices for the plurality of subbands using a second encoding scheme of the set; and
   determining that the first message length is less than the second message length, wherein selecting the first encoding scheme is based at least in part on the first message length being less than the second message length.

8. The method of claim 7, wherein:
   the second message length is fixed; and
   the first message length is based at least in part on a frequency correlation for the plurality of subbands.

9. The method of claim 1, further comprising:
   determining that a number of the plurality of subbands is above a threshold, wherein transmitting the indication of the first channel quality indicator index and the indication of the second channel quality indicator index using different numbers of bits is based at least in part on the number of the plurality of subbands being above the threshold.

10. A method for wireless communication at a network device, comprising:
    transmitting, to a user equipment (UE), a plurality of reference signals on a plurality of subbands;
    selecting a decoding scheme from a set of decoding schemes for decoding indications of channel quality indicator indices for subbands, wherein the selected decoding scheme is based at least in part on Huffman coding;
    receiving, from the UE, an indication of a baseline channel quality indicator index;
    receiving, from the UE and based at least in part on receiving the indication of the baseline channel quality indicator index, an indication of a first channel quality indicator index for a first subband of the plurality, wherein the indication of the first channel quality indicator index comprises a first number of bits in accordance with an encoding scheme corresponding to the selected decoding scheme; and
    receiving, from the UE and based at least in part on receiving the indication of the baseline channel quality indicator index, an indication of a second channel quality indicator index for a second subband of the plurality, wherein the indication of the second channel quality indicator index comprises a second number of bits that is different than the first number of bits in accordance with the encoding scheme corresponding to the selected decoding scheme.

11. The method of claim 10, wherein:
the indication of the first channel quality indicator index indicates a first offset between the baseline channel quality indicator index and the first channel quality indicator index; and
the indication of the second channel quality indicator index indicates a second offset between the baseline channel quality indicator index and the second channel quality indicator index.

12. The method of claim 10, wherein the baseline channel quality indicator index is a third channel quality indicator index for a third subband of the plurality.

13. The method of claim 10, further comprising:
determining a modulation and coding scheme to use for a downlink transmission on the first subband based at least in part on the indication of the first channel quality indicator index or for a downlink transmission on the second subband based at least in part on the indication of the second channel quality indicator index; and
transmitting the downlink transmission on the first subband or the second subband using the determined modulation and coding scheme.

14. The method of claim 10, further comprising:
receiving, from the UE, an indication of the encoding scheme for the indication of the first channel quality indicator index and the indication of the second channel quality indicator index, wherein selecting the decoding scheme is based at least in part on the indication of the encoding scheme; and
decoding, based at least in part on the selected decoding scheme, the indication of the first channel quality indicator index and the indication of the second channel quality indicator index to obtain the first channel quality indicator index and the second channel quality indicator index.

15. The method of claim 14, wherein:
receiving the indication of the first channel quality indicator index and the indication of the second channel quality indicator index is in accordance with a first schedule; and
receiving the indication of the encoding scheme is in accordance with a second schedule that is less frequent than the first schedule.

16. The method of claim 10, wherein:
the selected decoding scheme is a first decoding scheme of the set and assigns different numbers of bits to indications of different channel quality indicator indices; and
a second decoding scheme of the set assigns a fixed number of bits to all indications of channel quality indicator indices.

17. The method of claim 10, further comprising:
determining that a number of the plurality of subbands is above a threshold, wherein receiving the indication of the first channel quality indicator index and the indication of the second channel quality indicator index using different numbers of bits is based at least in part on the number of the plurality of subbands being above the threshold.

18. An apparatus for wireless communication at a user equipment (UE), comprising:
a processor,
memory coupled with the processor, and
instructions stored in the memory and executable by the processor to cause the apparatus to:
receive a plurality of reference signals on a plurality of subbands;
determine, based at least in part on the plurality of reference signals, a respective channel quality indicator index for each of the plurality of subbands;
select an encoding scheme from a set of encoding schemes for encoding indications of channel quality indicator indices for subbands, wherein the selected encoding scheme is based at least in part on Huffman coding;
transmit, to a network device, an indication of a baseline channel quality indicator index;
transmit, to the network device and based at least in part on transmitting the indication of the baseline channel quality indicator index, an indication of a first channel quality indicator index for a first subband of the plurality, wherein the indication of the first channel quality indicator index comprises a first number of bits in accordance with the selected encoding scheme; and
transmit, to the network device and based at least in part on transmitting the indication of the baseline channel quality indicator index, an indication of a second channel quality indicator index, wherein the indication of the second channel quality indicator index comprises a second number of bits that is different than the first number of bits in accordance with the selected encoding scheme.

19. The apparatus of claim 18, wherein:
the indication of the first channel quality indicator index indicates a first offset between the baseline channel quality indicator index and the first channel quality indicator index; and
the indication of the second channel quality indicator index indicates a second offset between the baseline channel quality indicator index and the second channel quality indicator index.

20. The apparatus of claim 18, wherein the baseline channel quality indicator index is a third channel quality indicator index for a third subband of the plurality.

21. The apparatus of claim 18, wherein the instructions are further executable by the processor to cause the apparatus to:
transmit, to the network device, an indication of the selected encoding scheme.

22. The apparatus of claim 18, wherein the instructions are further executable by the processor to cause the apparatus to:
identify a frequency correlation for the plurality of subbands; and
select the encoding scheme based at least in part on the frequency correlation for the plurality of subbands.

23. The apparatus of claim 18, wherein the selected encoding scheme is a first encoding scheme of the set, and the instructions are further executable by the processor to cause the apparatus to:
determine a first message length for transmitting indications of channel quality indicator indices for the plurality of subbands using the first encoding scheme;

determine a second message length for transmitting indications of the channel quality indicator indices for the plurality of subbands using a second encoding scheme of the set; and determine that the first message length is less than the second message length, wherein selecting the first encoding scheme is based at least in part on the first message length being less than the second message length.

24. The apparatus of claim 23, wherein:

the second message length is fixed; and the first message length is based at least in part on a frequency correlation for the plurality of subbands.

25. An apparatus for wireless communication at a network device, comprising:

a processor, memory coupled with the processor, and instructions stored in the memory and executable by the processor to cause the apparatus to:

transmit, to a user equipment (UE), a plurality of reference signals on a plurality of subbands;

select a decoding scheme from a set of decoding schemes for decoding indications of channel quality indicator indices for subbands, wherein the selected decoding scheme is based at least in part on Huffman coding;

receive, from the UE, an indication of a baseline channel quality indicator index;

receive, from the UE and based at least in part on receiving the indication of the baseline channel quality indicator index, an indication of a first channel quality indicator index for a first subband of the plurality, wherein the indication of the first channel quality indicator index comprises a first number of bits in accordance with an encoding scheme corresponding to the selected decoding scheme; and receive, from the UE and based at least in part on receiving the indication of the baseline channel quality indicator index, an indication of a second channel quality indicator index for a second subband of the plurality, wherein the indication of the second channel quality indicator index comprises a second number of bits that is different than the first number of bits in accordance with the encoding scheme corresponding to the selected decoding scheme.

26. The apparatus of claim 25, wherein the instructions are further executable by the processor to cause the apparatus to:

receive, from the UE, an indication of the encoding scheme for the indication of the first channel quality indicator index and the indication of the second channel quality indicator index;

select the decoding scheme based at least in part on the indication of the encoding scheme; and decode, based at least in part on the selected decoding scheme, the indication of the first channel quality indicator index and the indication of the second channel quality indicator index to obtain the first channel quality indicator index and the second channel quality indicator index.

27. The apparatus of claim 25, wherein:

the selected decoding scheme is a first decoding scheme of the set and assigns different numbers of bits to indications of different channel quality indicator indices; and a second decoding scheme of the set assigns a fixed number of bits to all indications of channel quality indicator indices.

* * * * *